Figure 1:
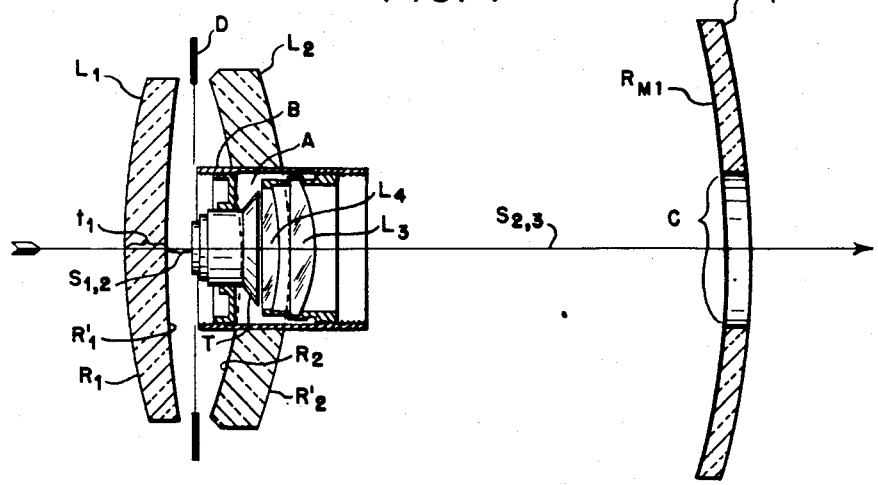

Jan. 28, 1964 M. SHENKER 3,119,892
CATADIOPTRIC SYSTEM
Filed July 1, 1960 2 Sheets-Sheet 1

INVENTOR
Martin Shenker
BY
ATTORNEYS

Jan. 28, 1964   M. SHENKER   3,119,892
CATADIOPTRIC SYSTEM
Filed July 1, 1960   2 Sheets-Sheet 2

INVENTOR
Martin Shenker
BY
ATTORNEYS

United States Patent Office 3,119,892
Patented Jan. 28, 1964

3,119,892
CATADIOPTRIC SYSTEM
Martin Shenker, Monsey, N.Y., assignor to Farrand Optical Co., Inc., New York, N.Y., a corporation of New York
Filed July 1, 1960, Ser. No. 40,459
14 Claims. (Cl. 88—57)

This invention relates to a mirror-lens system of the Cassegrainian type in which a corrector component is inserted in front of the convergently operating principal mirror, i.e. optically on the long conjugate side thereof. This corrector component comprises two lenses, one positive and one negative, which enclose between them a divergently operating air space.

Catadioptric systems of this general type have been repeatedly proposed. They have the advantages of compact construction, low weight, and image quality adequate for most purposes of general photography, at least in embodiments of moderate focal length up to about 20 to 25 inches, and at relative apertures of about $f/5$. The useful field of such systems amounts to about 3°.

This general type of objective is further developed in accordance with the invention to provide systems of very long focal length with excellent image properties.

Efforts to improve the image properties of catadioptric systems of this general type have been long pursued. These attempts have sought to improve the performance of such systems with respect to their relative aperture and with respect to their contrast and image sharpness.

Among these efforts the introduction of the aspheric corrector plate of Schmidt is particularly noteworthy. (See Zentralzeitung fuer Optik und Mechanik, vol. 52, pages 25 and 26, 1931.) By means of the Schmidt plate, the aberrations of the spherical mirror are to a large extent corrected, with great improvement in the image properties of the system. Nonetheless, in the Schmidt telescope the plane surface of the plate, the other surface of which provides the aspheric correcting surface, gives rise to pronounced ghosts. To avoid this difficulty it has been proposed to change the shape of the corrector plate to a meniscus whose curved surfaces make it possible to obviate the effect of ghosts. Such a proposal is mentioned by Sonnefeld in the Jenaer Jahrbuch of the Zeiss Company for 1953, page 212.

It has further been proposed to provide the meniscus substitute for the Schmidt corrector plate with a considerable thickness and moreover to make both its surfaces concentric with the diaphragm position. In this way there is obviated the necessity for an aspheric deformation of the correcting surfaces of the plate, with consequent simplification in manufacture thereof. Catadioptric systems of this type are described in the Journal of the Optical Society of America, volume 34, May 1944 by D. D. Maksutov and in U.S. Patents Nos. 2,420,349 and 2,492,461 of Bouwers, in British Patents Nos. 618,253 and 712,284, and in Swiss Patent No. 255,151.

In these proposals the correcting meniscus takes the shape of a concentric lens with surfaces convex toward the object, disposed on the object side of the diaphragm (U.S. Patent No. 2,492,461, FIG. 4), or with surfaces concave toward the object, when the correcting meniscus is disposed behind the diaphragm.

Irrespective of which of these arrangements is adopted, such corrector lenses nonetheless suffer the disadvantage of strong chromatic aberrations and consequent severe limitation of image quality as soon as the system is employed with other than monochromatic light. Consequently it was at an early date proposed to make the correcting lens in the form of a partially or totally achromatized doublet concentric or nearly concentric with the diaphragm. See FIG. 3 of Swiss Patent No. 255,151 which shows a cemented doublet, and FIGS. 2 and 3 of U.S. Patent No. 2,420,349 which show an uncemented doublet comprising two lenses of opposite power sign spaced closed together. Even these arrangements however have not fulfilled the hopes entertained therefor since the disposition of such lenses of relatively high power on one side of the diaphragm increases the asymmetry errors in oblique ray bundles of high aperture.

Reduction of such asymmetry errors has been attempted in U.S. Patent No. 2,420,349 (FIG. 4) by the disposition of two concentric lenses symmetrically with respect to the diaphragm. This imposes however on the correction system a strong divergent effect which increases the chromatic errors. It has therefore been still further proposed to shape these lenses not quite concentrically but rather to bend them so that they possess an approximately concentric form, but only with respect to their exterior surfaces which are remote from the diaphragm position, one lens being negative and the other positive, as illustrated in FIG. 1 of British Patent No. 618,253. In this patent the lens component of the corrector system lying behind the diaphragm (in the direction of light traveling toward the principal mirror) is a positive meniscus. In contrast to this development, FIGURE 3 of U.S. Patent No. 2,492,461 shows a planoconvex lens as the corrector element in front of the diaphragm while the element following the diaphragm takes the usual shape of a concentric lens and therefore possesses the shape and has the effect and refractive power of a negative meniscus.

These concentric lenses, which are characteristic of most catadioptric systems, posses not only strong surface curvatures but are widely spaced from each other, with the diaphragm position between them. This arrangement is chosen in order to make as small as possible the angle of incidence of the principal rays on the individual surfaces of these concentric lenses. Since however strong surface curvatures are always associated with strong aberrations of higher order, it is desirable in the interest of image quality to modify or even to abandon the disposition of the corrector system in lens pairs concentric about the diaphragm position, as in the case already mentioned employing a planoconvex lens as part of the corrector system. Such an arrangement makes it possible substantially to reduce the very large air space within the corrector system and in this way to reduce the unfavorable effect of this large air space on the color correction properties of the catadioptric system as a whole. This can advantageously be combined with achromatization of the corrector elements by making them in the form of doublets. The previous efforts to exploit this possibility have however been limited by the large increase of comatic aberration, the correction of which can otherwise be obtained by symmetric or partly symmetric disposition of concentric lens with respect to the diaphragm.

A further disadvantage of catadioptric objectives whether provided with correction of the Schmidt plate type or of the type just described, is that in systems with one positive powered mirror and thus one reflection a strong curvature of field results and in systems with two mirrors of opposite power and thus two reflections strong comatic aberrations result. The optical deficiencies of the single mirror type have been somewhat relieved through the introduction of curved sensitive image surfaces which however have their own inherent difficulties. For the two-mirror type systems no similar method is available to relieve the comatic deficiencies, which fact much reduces the utility of the system for photographic purposes except in the immediate vicinity of the axis. To obviate this disadvantage proposals have been made, as by Violette (Revue d'Optique, vol. 14, pages 81 to 106), to dispose appropriate supplementary corrector lenses in the air space between the primary and/or secondary mirrors and the image plane, and particularly in the vicinity of the image plane. Through the action of such supplementary lenses close to the focus, the field correction of the bundles is however much impaired, despite the attenuation of the bundles upon passage through such supplementary lenses, the coma correction being lost. It has however been shown by Back in U.S. Patent No. 2,701,983 that by the use of a multiple lens makeup therefor, one may achieve for such supplementary lenses in the vicinity of the focus a useful quasisymmetry and in this way recover some approximation of the coma-free condition.

These multiple efforts for improvement of the image qualities of catadioptric systems make it clear that the promise of these systems has not been fulfilled. Precisely the proposal of Violette underscores the fact that improvement of image quality is not necessarily to be achieved with strongly divergent concentric lenses, which have objectionable effects on both the chromatic correction and on aberrations of higher order.

Figure 4:
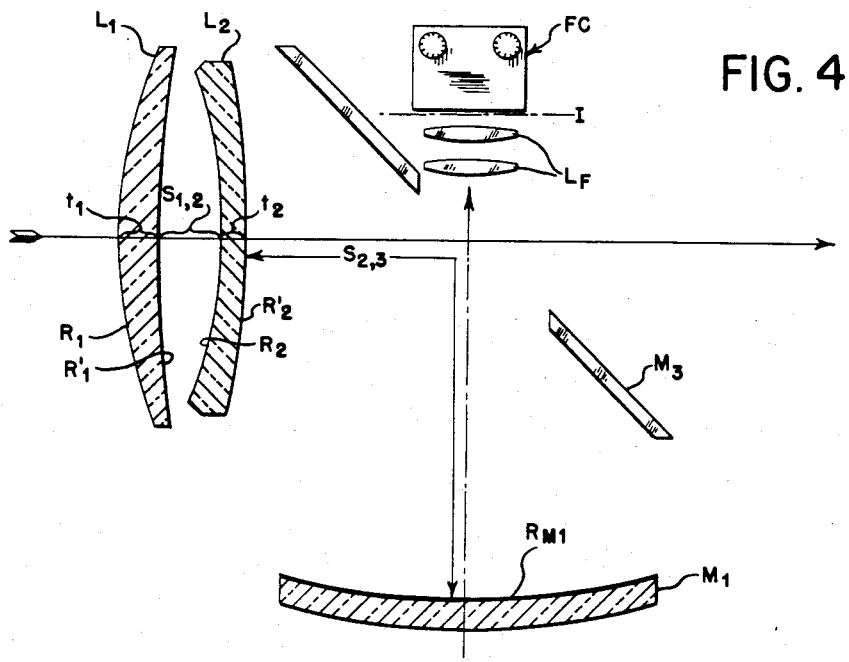

It has been attempted to diminish these chromatic and spherochromatic errors of the refractive corrector meniscus lenses proposed in place of the Schmidt plate by making them with very low refractive power and by combining them with supplementary lenses as above described and further by using, in place of one meniscus, a pair of oppositely disposed meniscus lenses of oppoiste power, contrary to the showing of FIG. 4 of U.S. Patent No. 2,420,349. In their combined effect these lenses of opposite power do not display the disadvantageous divergent effect of previous proposals and yet retain a substantial corrective effect. See German Patent No. 824,558 and U.S. Patent No. 2,726,574 and Patent No. 13,303 of the German Democratic Republic.

The drive for improved image properties in catadioptric systems goes way back in time. A summary is contained in the article of J. Fluegge, Zeitschrift fur Instrumentenkunde, volume 61, 1941, which discusses the aplanatic mirror objectives in which there are attained not only aplanatic properties but also correction of spherical aberration and fulfillment of the sine condition of Abbe. Still further proposals are set forth by H. Slevogt in volume 62 of the same publication at pages 312 to 327. In accordance with the proposal described by Slevogt the spacing between the principal mirror and the auxiliary or secondary mirror is filled with a glass of appropriate index so that the reflecting surfaces of the first and second mirrors are formed upon and constitute parts of the outer surfaces of a very thick lens. In this way it is possible very substantially to reduce the aberrations of the third order and especially those of higher orders, and indeed to make them approach zero. However the long path lengths in glass characteristic of such a system mean that rays of various wave length will be variously treated as soon as these rays pass through the refracting portions of the surfaces of these mirror lenses. For such objectives to be useful in practice, the very low residual aberrations which characterize them at one wave length would have to obtain over a range of wave lengths, a condition which cannot be achieved in this type of system.

A second limitation on these systems is the following: Optical systems with such low residual aberrations that their image errors are substantially limited by diffraction are of course well adapted for use in embodiments having very long focal lengths. In the practical realization of such devices according to Slevogt's proposal however this entails, for a mirror-lens objective of moderate relative aperture and, for example, of 12 inch diameter and 25 inch spacing between the vertices of the primary and secondary mirrors, a weight of some 260 pounds, even with light crown glass. Apart from this awkward weight, it is in practice almost impossible to achieve such a mass of glass with adequate homogeneity and freedom from strain, which properties are indispensable if the theoretically available image properties limited by diffraction are to be achieved.

In contrast to these proposals of the prior art the invention provides a system with an extremely high quality of image formation, very close to the given diffraction limit even for very long focal lengths in a compact system of light weight, easy to manufacture and of extremely high image quality even when made up with normal glasses. The invention includes systems with and systems without a secondary mirror provided between the primary mirror and its prime focus in order to shift the final image position out from the internal portion of the system. In fact the invention is particularly advantageously embodied in systems including such a secondary mirror when small dimensions are desired, or when other limitations are imposed on the nature of the final sensitive image surface. Thereby the invention effects an important improvement in the constructional dimensions of long focal length systems, because it must be noted that two-mirror systems as such are not necessarily compact and may even at low relative aperture involve technical complications. These may include for example the difficulties of centering multi-lens correction components as in the case of FIG. 8 of U.S. Patent No. 2,571,657, as well as the system noted by Zoellner in the Janaer Jahrbuch for 1951, page 62, lines 2 to 5.

In contrast to these previous proposals which entail multiplication of the elements of the correction system, the present invention disposes a two-element corrector system in the region of maximum ray bundle diameter, close to and usually surrounding the diaphragm. The invention dimensions the individual powers of these elements and establishes a new and improved power distribution for and between the individual surfaces and elements with respect to each other and with respect to the equivalent power of the entire system.

The invention makes it possible to produce long focal length catadioptic systems of extremely high image quality utilizing relatively long radii of curvature and relatively low thicknesses for the elements thereof which in all respects fulfill the requirements for practical high precision manufacture.

The invention will now be further described with reference to the accompanying drawings, in which FIGS. 1 to 4 are axial sections through four catadioptic systems according to the invention. In all figures, the long conjugate side of the system is to the left.

In the embodiment of FIG. 1 the final image plane lies within the system, i.e. is axially positioned between the outermost of the refracting and reflecting elements thereof. The embodiments of FIGS. 2 to 4 include a secondary mirror, disposed optically between the principal mirror and the final image position, which is thrown outside the system, i.e. axially outside the outermost of the refracting and reflecting elements thereof.

The system of FIG. 1 comprises a primary mirror $M_1$ and a two-element corrector including lenses $L_1$ and $L_2$, between which is positioned a diaphragm D. The system of FIG. 1 does not include a secondary mirror. Mirror $M_1$ is rendered reflecting on its concave surface (i.e. its left-hand surface, in FIG. 1) by suitable means such as a silver coating. A central zone C may however be made non-reflecting if desired, in order to minimize the effect of stray light reflected from the baffle tube B to be described presently, and from the elements within it.

The rear corrector element $L_2$ is centrally apertured at A, and suitable means may be there positioned to receive and, if desired, to record the image produced by the system. A light baffle in the shape of a tubular member B is shown within this aperture and, by way of example only, there is shown within the baffle an orthicon type cathode ray tube T for the generation and transmission to a remote location of signals representative of the image produced by the catadioptric system of the figure. Field lenses $L_3$ and $L_4$ are also shown, provided for the purpose of adjusting the curvature of the image produced by the element $M_1$, $L_1$ and $L_2$ to conform to the image receiving surface of tube T. Systems according to FIG. 1 may be constructed with comparatively high relative aperture.

The corrector lenses $L_1$ and $L_2$ are both of meniscus shape and are disposed with their concave surfaces facing each other, element $L_1$ being positive in power and element $L_2$ being negative in power. $L_1$ is therefore a positive meniscus, and $L_2$ is a negative meniscus. Other properties of the embodiment of FIG. 1, which it possesses in common with the embodiments of FIGS. 2 to 4, will be discussed after a description is given of the systems of those figures.

Figure 2:
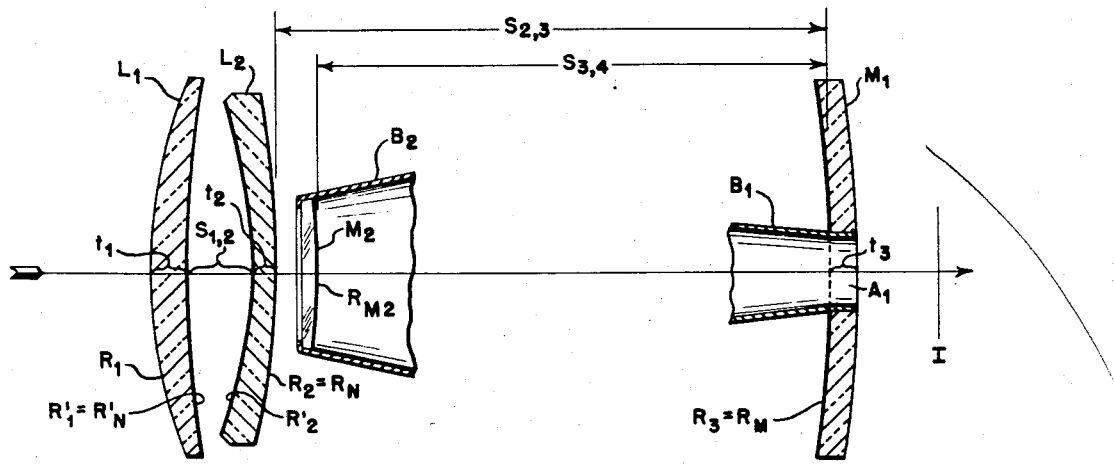

FIG. 2 shows a catadioptric system according to the invention comprising a principal mirror $M_1$, a secondary mirror $M_2$ and a corrector including elements $L_1$ and $L_2$. In FIG. 2, mirror $M_1$ is silvered on its left-hand, concave surface, and mirror $M_2$ is silvered on its right-hand surface. The principal $M_1$ mirror is apertured at $A_1$, and the final image position of the system, identified at I, is located behind mirror $M_1$. A light baffle $B_1$ is fitted to the aperture of mirror $M_1$, and a baffle $B_2$ is fitted about mirror $M_2$.

Systems as shown generally in FIG. 2 may be built with either a convex or concave shape to the reflecting surface $R_{M2}$ of the secondary mirror. When this surface is concave it possesses a convergent effect. This makes it possible for the system to have high relative aperture, but with shorter focal length and relatively more curved final image surface for a given diameter of the various elements. The other form in which this secondary mirror is convex and therefore divergent in effect leads to long focal length systems of moderate relative aperture in which the principal points are advantageously disposed, since the negative power of the convex mirror is located at a relatively large distance from the principal mirror $M_1$ and hence from the convergent power thereof. In this way the combination of principal and secondary mirror is given the characteristics of a telephoto objective, the positive element being the principal mirror and negative element being the convex secondary mirror. The limiting case between the two classes is achieved when the radius of curvature for the secondary mirror is infinite and its surface therefor plane. The focal length for the reflecting surface then becomes likewise infinite and the secondary mirror operates simply to change the direction of the rays without dioptric effect thereon.

Figure 3:
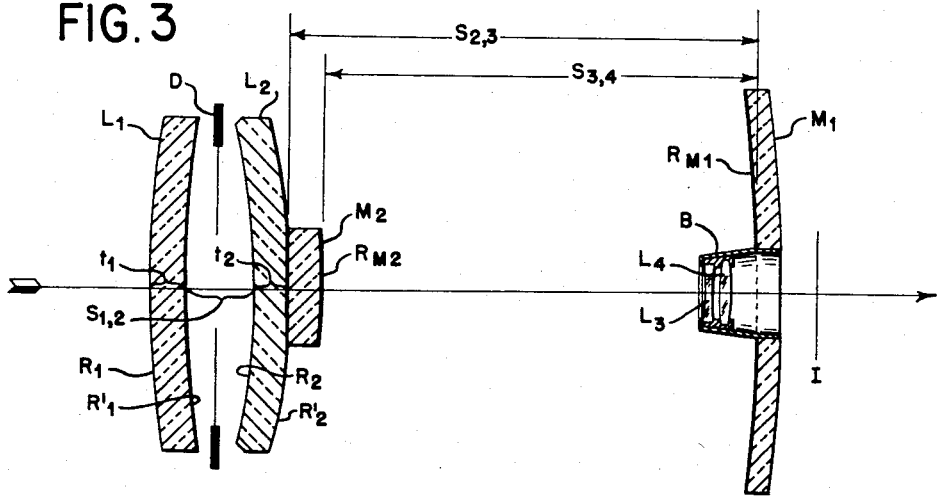

In the system of FIG. 2 the secondary mirror $M_2$ is located very near the corrector lenses $L_1$ and $L_2$. It is therefore convenient to combine one of the corrector lenses with the secondary mirror. The flexibility of the invention makes this solution practically possible, and an example thereof is shown in FIG. 3. In FIG. 3 the reflecting surface of the secondary mirror $M_2$ is formed on the right-hand surface of a separate piece of glass cemented to the corrector lens $L_2$. While it is possible for the secondary mirror to be formed directly on the rear surface of the second corrector element, this requires that it have the same radius of curvature as that rear surface.

In the embodiment of FIG. 3 there are shown supplementary lenses $L_3$ and $L_4$ located in the vicinity of the focal point, and disposed within a baffle tube B affixed to the principal mirror $M_1$, which is silvered on its left-hand surface $R_{M1}$. This construction facilitates centering of the refractive surfaces of these supplementary lenses with respect to the principal mirror $M_1$, to produce a unitary structure easy to position with respect to the combination of corrector elements $L_1$, $L_2$, a secondary mirror $M_2$ and diaphragm D.

FIG. 4 illustrates an embodiment in which a plane mirror $M_3$ is employed for deviation of the rays. This mirror, silvered on its lower side as seen in FIG. 4, is disposed between the corrector lenses $L_1$ and $L_2$ and the principal mirror $M_1$, which is silvered on its upper, concave surface $R_{M1}$. The plane mirror $M_3$ is centrally apertured to permit passage to the final image plane I of light reflected from $M_1$ after passage through the corrector lenses $L_1$ and $L_2$. A camera FC is illustrated behind the mirror $M_3$ with the film plane thereof lying in the image plane I of the system. Supplementary field lenses $L_F$ are shown between this film plane and the principal mirror for the purpose of matching the shape of the image surface produced by the principal mirror to the shape of the image receiving surfaces, i.e. that of the film. In all figures the radii of curvature of the refracting and reflecting surfaces are denoted by the symbol R, with subscripts identifying the elements to which they belong. In the case of the refractive elements, such as corrector lenses $L_1$ and $L_2$, an unprimed symbol R denotes the radius of curvature on the surface on the long conjugate side of the element, and the symbol R' denotes the radius of curvature of the surface on the short conjugate side of the element. The thicknesses of elements $L_1$ and $L_2$ are denoted $t_1$ and $t_2$ respectively, and their axial spacing is denoted $s_{1,2}$. The axial spacing of $L_2$ from the vertex of the principal mirror $M_1$ is denoted $s_{2,3}$, and in the embodiments of FIGS. 2 and 3 which possess such a secondary mirror $M_2$, the spacing of the vertices of mirrors $M_1$ and $M_2$ is denoted $s_{3,4}$. The powers of individual refracting surfaces are denoted by the symbol $\phi$ with a subscript identifying the surface in question. The power of a surface of radius R preceded, in the sense of travel of the ray, by a medium of index $n$ and followed by a medium of index $n'$, is given by the relation $$\phi = \frac{n'-n}{R}$$

If R is in meters, $\phi$ is given in diopters. The powers $\Phi_{L_1}$ and $\Phi_{L_2}$ of the corrector lenses $L_1$ and $L_2$ are obtained by summing algebraically the powers of the surfaces respectively. In addition, the symbol $\Phi_S$ represents the equivalent power of the complete system.

Reference will also be made to the Gardner shape factor $\sigma$ of the lenses $L_1$ and $L_2$ and of the air space between them. For a lens of front and rear radii R and R' this factor is given by the relation $$\sigma = \frac{R'+R}{R'-R}$$

In accordance with the invention, in each of the embodiments of FIGS. 1 to 4, the power sums $\Phi_{L_1}$ and $\Phi_{L_2}$ of the powers of the surfaces of the lenses $L_1$ and $L_2$ are of opposite sign. In addition, the powers of the front surfaces $R_1$ and $R_2$ of $L_1$ and $L_2$ are of opposite sign, and so are the powers of their rear surfaces $R'_1$ and $R'_2$. The sums $\Phi_{L_1}$ and $\Phi_{L_2}$ of both $L_1$ and $L_2$ lie between $-0.20\Phi_S$ and $+0.20\Phi_S$. Algebraically therefore one may write for the systems of the invention the following conditions:

$$\Phi_{L_1} = -\alpha \Phi_{L_2} \qquad (1)$$

$$0 < \Phi_{L_1} < +.2\Phi_S \qquad (2)$$

$$0 > \Phi_{L_2} > -.2\Phi_S \qquad (3)$$

In Condition 1, $\alpha$ is a dimensionless positive factor which can take on the value unity. Both corrector elements are of meniscus form and have a numerical value for the Gardner shape factor $\sigma$ between $+1$ and infinity:

$$1 < \sigma_{L_1} \infty \qquad (4)$$

$$1 < \sigma_{L_2} < \infty \qquad (5)$$

In contrast to the previous proposals known to applicant however, the lenses $L_1$ and $L_2$ are provided with a power distribution as specified in Conditions 1, 2 and 3 above and with the further condition that the negative power $\phi_{R'_1}$ of the rear surface of $L_1$, which surface is concave toward the primary mirror $M_1$, lies between 2.25 and 12.5 times the sum of the surface powers of the second corrector lens $L_2$. Algebraically:

$$2.25\Phi_{L_2} < \phi_{R'_1} < 12.5\Phi_{L_2} \quad (6)$$

In addition, the air space $s_{1,2}$ between the rear surface $R'_1$ of the convergent front element $L_1$ and the front, divergently operating surface $R_2$ of the divergent rear element $L_2$ possesses a Gardner shape factor whose absolute value lies between 0 and 0.450. The departure of this air space from equiconvex form is consequently less than 0.450, in terms of its Gardner shape factor, and the air space is limited on the front side by a convergent meniscus. Algebraically:

$$\Phi_{L_1} = +\beta \Phi_S \quad (7)$$

$$0 < |\sigma_{1,2}| < 0.450 \quad (8)$$

In Condition 7 $\beta$ denotes a small positive factor, whose value is less than unity, and typically of the order of 0.10.

Conditions 7 and 8 in conjunction with Condition 1 likewise differentiate the systems of the invention from the prior art, in which it was customary to maintain an approximately equiconvex shape for the air space between the corrector lenses whenever they were of the same sign, but to make the shape of that air space strongly asymmetric when the corrector elements limiting it were of opposite sign.

The catadioptric objective systems of the invention possess not only an excellent "normal" spherochromatic correction of their intersection distances but also permit fulfillment of the Gauss condition. For fulfillment of the Gauss condition there is achieved chromatic correction not only of the intersection distances but of the equivalent focal lengths as well. Thus the achromatization is achieved not only at the image point (which coincides with the focal point for distant objects) but also at the rear principal point. Accordingly in the new objectives there is obtained chromatic correction of the principal points as well as of the focal points, and with appropriate choice of glasses this may be done not only for two but for several different wave lengths. An additional and highly surprising advantage of the invention is that it provides an almost total elimination of secondary and tertiary spectrum, over a wide spectral range at any selected zone of the aperture which the designer can choose at his discretion. This can be achieved in embodiments of the invention wherein the two correctors are both of the same material and also in embodiments of the invention wherein the two correctors are of different materials.

It is only by such complete elimination of the secondary spectrum over a large spectral range that an imaging system having low monochromatic errors leads to that high degree of image quality which approaches the resolution limit set by diffraction. The invention achieves this improvement while retaining the relatively simple construction of a variation on the Schmidt mirror objective, providing a practical construction for long focal length objective systems of extremely high image quality for the first time.

In this respect also the invention is in clear contrast to previous proposals, particularly those of Violette Revue d'Optique, 1935, pages 81 to 106) which sought to achieve improvement in third order correction. With the long focal length catadioptric systems of the invention the improvement sought and achieved pertains not to third order correction but rather to the correction of errors of still higher order. These higher order aberrations, in spite of their small numerical values, which are negligible in ordinary systems, are highly objectionable in that they have hitherto prevented approach in catadioptric systems to image quality limited by the diffraction limit. These residual aberrations of higher order include not only the zonal errors of the true aperture aberrations, but also the zonal and lateral residuals of the asymmetry errors, which cannot even be computed or otherwise dealt with in third order technique.

For achievement of a particularly high degree of freedom from asymmetry errors in the lateral portions of the field, which must be achieved if optimum image performance is to be obtained under all circumstances without impairment of the sine condition, the asymmetry in the distribution of the convergent powers between the two convergently operating surfaces $R_1$ of $L_1$ and $R'_2$ of $L_2$ in the corrector portion of the system is so limited that the surface power $\phi_{R'_2}$ of the surface $R'_2$ lies between 0.5 and amounts to less than 1.5 times the surface power $\phi_{R_1}$ of the convergent front surface $R_1$. Algebraically:

$$0.5\phi_{R_1} < \phi_{R'_2} < \phi_{R_1} \quad (9)$$

The state of the prior art shows that this power distribution of the invention is completely different from that hitherto employed. The patent literature discloses fundamental differences in both directions from the range of power distribution set forth in Condition 9. Patent No. 13,303 of the German Democratic Republic shows, for the surface corresponding to power of the rear surface $R'_2$ of the present application a power of only 3.59% of the power of the surface $R_1$. On the other hand, in Example 3 of U.S. Patent No. 2,492,461 and Examples 1 and 2 of the U.S. Patent No. 2,726,574, the power of the surface corresponding to $R'_2$ of the present application exceeds 1.5 times the power of the surface corresponding to $R_1$. Moreover, although they have in common with the catadioptric system of the present invention a corrector comprising two lenses of opposite power sign, the systems of these patents do not conform to the requirements of extremely high image performance and they do not fulfill Conditions 1 to 8 hereinabove set forth.

Thus according to the invention and in contrast to previous proposals there is provided only the above-given slight numerical departure from symmetry in the powers of the convergent outer surfaces $R_1$ and $R'_2$ of the corrector lenses $L_1$ and $L_2$. This feature of the invention makes possible achievement of a high degree of freedom from asymmetry errors and thereby permits a very significant improvement in the image quality of lens-mirror objective systems.

For the practical construction of systems according to the invention both of the corrector lenses $L_1$ and $L_2$ may be made of a single glass type. According to the invention however, for achievement of maximum reduction in residual aberrations, these corrector lenses are made of different glasses having different indices of refraction, but having a similar variation in dispersion throughout a wide spectral range and having also low secondary spectrum. By introduction of a suitable difference in index between the two partial lenses $L_1$ and $L_2$ there is made available a further possibility for reduction in aberrations of higher order.

A number of examples of lenses according to the invention will now be given, first in terms of an approximate distribution of powers among the surfaces and elements thereof and in approximate dimensions and specifications of glasses, and then in terms of exact powers, dimensions and glass specifications computed to a larger number of significant figures.

TABLE 1

*Approximate Power Distribution, Example I*

$$\phi_{R_1} = +0.85\Phi_S$$
$$\phi_{R'_1} = -0.75\Phi_S$$
$$\Phi_{L_1} = +0.1\Phi_S$$
$$\phi_{R_2} = -1.13\Phi_S$$
$$\phi_{R'_2} = +1.0\Phi_S$$
$$\Phi_{L_2} = -0.13\Phi_S$$
$$\phi_{M_1} = +1.7\Phi_S$$
$$\phi_{M_2} = -1.7\Phi_S$$

TABLE 2

*Approximate Dimensions and Glass Indices, Example I*

[Dimensions given as multiples of equivalent focal length $f$ of the system]

| Element | Radii | Thickness $t$ or Spacing $s$ | Index of Refraction $n$ |
|---|---|---|---|
| $L_1$ | $R_1 = +0.6f$ <br> $R'_1 = +0.68f$ | $t_1 = 0.015f$ <br> $s_{1,2} = 0.03f$ | $n_1 = 1.51$ |
| $L_2$ | $R_2 = -0.45f$ <br> $R'_2 = -0.5f$ | $t_2 = 0.016f$ <br> $s_{2,3} = 0.38f$ | $n_2 = 1.51$ |
| $M_1$ | $R_{M_1} = -1.18f$ | $s_{3,4} = 0.35f$ | |
| $M_2$ | $R_{M_2} = -1.18f$ | | |

Even with this approximate power distribution and specification of dimensions and glasses, the Conditions 1 to 9 hereinabove set forth which are characteristic of the invention are satisfied.

In Condition 1, the factor $\alpha$ here assumes the value 0.77. As required by each of Conditions 2 and 3, $\Phi_{L_1}$ and $\Phi_{L_2}$ both lie between zero and $+0.2\Phi_S$. For the corrector lenses $L_1$ and $L_2$, the Gardner shape factors have values $\sigma_{L_1} = 16$ and $\sigma_{L_2} = 19$ as required by Conditions 4 and 5. $\phi_{R'_1}/\Phi_{L_2} = 5.77$ consistently with Condition 6. In Condition 7 $\beta$ assumes the value $+0.1$ consistently with that condition. Consistently with Condition 8, the Gardner shape factor for the air space $s_{1,2}$ between $L_1$ and $L_2$ has the value $\sigma_{1,2} = 0.20$. Consistently with Condition 9, $\phi_{R'_2}/\phi_{R_1} = 1.18$.

The catadioptric system of I, having data in broad conformity with Tables 1 and 2, when computed out to possess the fine correction of which it is capable, will have the power distribution and the dimensions and glass specifications set forth in the following Tables 3 and 4 (the data of Table 4 being given for an equivalent focal length $f$ of 1,000 mm.).

TABLE 3

*Exact Power Distribution, Example I*

$\phi_{R_1} = +0.849905\Phi_S$
$\phi_{R'_1} = -0.752929\Phi_S$
$\Phi_{L_1} = +0.096976\Phi_S$
$\phi_{R_2} = -1.137345\Phi_S$
$\phi_{R'_2} = +1.012238\Phi_S$
$\Phi_{L_2} = -0.125107\Phi_S$
$\phi_{M_1} = +1.700308\Phi_S$
$\phi_{M_2} = -1.700308\Phi_S$

TABLE 4

*Exact Dimensions and Glass Specifications, Example I*

[Effective focal length $f = 1000$ mm. Relative aperture 1:4.5]

| Element | Radii, mm. | Thickness $t$ or Spacing $s$, mm. | Index of Refraction $n$ | Abbe No. $\nu$ |
|---|---|---|---|---|
| $L_1$ | $R_1 = +608.303$ <br> $R'_1 = +686.652$ | $t_1 = 15.322$ <br> $s_{1,2} = 30.645$ | $n_1 = 1.5170$ | $\nu_1 = 64.5$ |
| $L_2$ | $R_2 = -454.567$ <br> $R'_2 = -510.750$ | $t_2 = 16.344$ <br> $s_{2,3} = 377.954$ | $n_2 = 1.5170$ | $\nu_2 = 64.5$ |
| $M_1$ | $R_{M_1} = -1,176.256$ | $s_{3,4} = 349.965$ | | |
| $M_2$ | $R_{M_2} = -1,176.256$ | | | |

A second example will now be described in which glasses of different refractive indices are used in the corrector lenses $L_1$ and $L_2$. The basic power distribution of the system of Example II is as follows:

TABLE 5

*Basic Power Distribution, Example II*

$\phi_{R_1} = +0.943\Phi_S$
$\phi_{R'_1} = -0.832\Phi_S$
$\Phi_{L_1} = +0.111\Phi_S$
$\phi_{R_2} = -1.119\Phi_S$
$\phi_{R'_2} = +0.994\Phi_S$
$\Phi_{L_2} = -0.125\Phi_S$
$\phi_{M_1} = +1.648\Phi_S$
$\phi_{M_2} = -1.648\Phi_S$ The system of Example II and also those of Examples III and IV yet to be described, have a relative aperture of the order of $f/4$. All of Examples I to IV possess the general arrangement illustrated in FIG. 2.

Approximate dimensions and glass indices for Example II are given in the accompanying Table 6.

TABLE 6

[Dimensions given as multiples of equivalent focal length $f$ of the system]

| Element | Radii | Thickness $t$ or Spacing $s$ | Index of Refraction $n$ |
|---|---|---|---|
| $L_1$ | $R_1 = +0.65f$ <br> $R'_1 = +0.73f$ | $t_1 = 0.016f$ <br> $s_{1,2} = 0.032f$ | $n_1 = 1.61$ |
| $L_2$ | $R_2 = -0.47f$ <br> $R'_2 = -0.53f$ | $t_2 = 0.017f$ <br> $s_{2,3} = 0.390f$ | $n_2 = 1.53$ |
| $M_1$ | $R_{M_1} = -1.21f$ | $s_{3,4} = 0.367f$ | |
| $M_2$ | $R_{M_2} = -1.21f$ | | |

Performance of fine correction on the data of Tables 5 and 6 leads to the following final data for the system of Example II.

TABLE 7

[Effective focal length $f = 1000$ mm.]

| Element | Radii, mm. | Thickness $t$ or Spacing $s$, mm. | Index of Refraction $n$ | Abbe No. $\nu$ |
|---|---|---|---|---|
| $L_1$ | $R_1 = +647.901$ <br> $R'_1 = +734.107$ | $t_1 = 16.334$ <br> $s_{1,2} = 31.614$ | $n_1 = 1.611$ | $\nu_1 = 5.88$ |
| $L_2$ | $R_2 = -469.257$ <br> $R'_2 = -528.200$ | $t_2 = 16.861$ <br> $s_{2,3} = 389.910$ | $n_2 = 1.525$ | $\nu_2 = 51.3$ |
| $M_1$ | $R_{M_1} = -1,213.508$ | $s_{3,4} = 366.199$ | | |
| $M_2$ | $R_{M_2} = -1,213.508$ | | | |

The third example to be described illustrates the wide constructional freedom which is at the disposal of the designer in the application of the invention. In particular, Example III shows that there is no need to give to the front corrector lens $L_1$ a higher (or lower) refractive index than to the rear corrector $L_2$. In Example III the rear corrector has the higher index.

The system of Example III is characterized by a basic distribution of powers as set forth in the accompanying Table 8.

TABLE 8

$\phi_{R_1} = +0.871\Phi_S$
$\phi_{R'_1} = -0.773\Phi_S$
$\Phi_{L_1} = +0.098\Phi_S$
$\phi_{R_2} = -1.279\Phi_S$
$\phi_{R'_2} = +1.130\Phi_S$
$\Phi_{L_2} = -0.149\Phi_S$
$\phi_{M_1} = +1.715\Phi_S$
$\phi_{M_2} = -1.715\Phi_S$ Approximate dimensions and glass specifications for the system of Example III are set forth in the accompanying Table 9.

TABLE 9
[Dimensions given as multiples of equivalent focal length $f$ of the System]

| Element | Radii | Thickness $t$ or Spacing $s$ | Index of Refraction $n$ |
|---|---|---|---|
| $L_1$ | $R_1 = +0.60f$ | $t_1 = 0.016f$ | $n_1 = 1.53$ |
|  | $R'_1 = +0.68f$ | $s_{1,2} = 0.030f$ |  |
| $L_2$ | $R_2 = -0.48f$ | $t_2 = 0.016f$ | $n_2 = 1.61$ |
|  | $R'_2 = -0.54f$ | $s_{2,3} = 0.375f$ |  |
| $M_1$ | $R_{M_1} = -1.17f$ | $s_{3,4} = 3.52f$ |  |
| $M_2$ | $R_{M_2} = -1.17f$ |  |  |

With fine correction, the dimensions and glass specifications for the system of Example III are as set forth in Table 10.

TABLE 10
[Effective focal length $f = 1000$ mm.]

| Element | Radii, mm. | Thickness $t$ or Spacing $s$, mm. | Index of Refraction $n$ | Abbe No. $\nu$ |
|---|---|---|---|---|
| $L_1$ | $R_1 = +602.695$ | $t_1 = 15.695$ | $n_1 = 1.525$ | $\nu_1 = 51.2$ |
|  | $R'_1 = +679.543$ | $s_{1,2} = 30.378$ |  |  |
| $L_2$ | $R_2 = -477.635$ | $t_2 = 16.201$ | $n_2 = 1.611$ | $\nu_2 = 58.8$ |
|  | $R'_2 = -540.565$ | $s_{2,3} = 374.657$ |  |  |
| $M_1$ | $R_{M_1} = -1,166.038$ | $s_{3,4} = 351.874$ |  |  |
| $M_2$ | $R_{M_2} = 1,166.038$ |  |  |  |

Examples I to III have been designed for use in the visible spectrum and the glasses have been selected accordingly. The invention is not however limited as to the spectral regions within which it can be used. There will now be given, as Example IV, data on an embodiment of the invention providing within the infrared, and specifically in the wave length region between 3 and 12 microns, the advantages of the invention including a high degree of freedom from residual aberrations. There are several optical materials which are transparent in this region of the spectrum, including AgCl and $As_2S_3$. Example IV has been computed for the use of the second of these materials in the refracting elements thereof.

The system of Example IV is characterized by a basic distribution of powers as set forth in the accompanying Table 11.

TABLE 11
$$\phi_{R_1} = +2.236\Phi_S$$
$$\phi_{R'_1} = -2.112\Phi_S$$
$$\Phi_{L_1} = +0.124\Phi_S$$
$$\phi_{R_2} = -2.858\Phi_S$$
$$\phi_{R'_2} = +2.684\Phi_S$$
$$\Phi_{L_2} = -0.174\Phi_S$$
$$\phi_{M_1} = +1.694\Phi_S$$
$$\phi_{M_2} = -1.694\Phi_S$$

With elements $L_1$ and $L_2$ made of $As_2S_3$, having at 6 microns an index of refraction of 2.40, approximate dimensions for the system of Example IV are given in the accompanying Table 12.

TABLE 12
[Dimensions given in multiples of equivalent focal length $f$ of the system]

| Element | Radii | Thickness $t$ or Spacing $s$ | Index of Refraction $n$ |
|---|---|---|---|
| $L_1$ | $R_1 = +0.63f$ | $t_1 = 0.007f$ | $n_1 = 2.40$ |
|  | $R'_1 = +0.66f$ | $s_{1,2} = 0.031f$ |  |
| $L_2$ | $R_2 = -0.49f$ | $t_2 = 0.007f$ | $n_2 = 2.40$ |
|  | $R'_2 = -0.52f$ | $s_{2,3} = 0.378f$ |  |
| $M_1$ | $R_{M_1} = -1.18f$ | $s_{3,4} = 0.355f$ |  |
| $M_2$ | $R_{M_2} = -1.18f$ |  |  |

The indices of refraction in Table 12 apply for radiation of 6 micron wavelength.

Fine correction of the data of Tables 11 and 12 gives the following exact dimensions, material index and dispersion values for the lens of Example IV.

TABLE 13
[Effective focal length $f = 1000$ mm.]

| Element | Radii, mm. | Thickness $t$ or Spacing $s$, mm. | Index of Refraction $n$ | Abbe No. $\nu$ |
|---|---|---|---|---|
| $L_1$ | $R_1 = +626.144$ | $t_1 = 7.145$ | $n_1 = 2.40035$ | $\nu_1 = 29.19$ |
|  | $R'_1 = +663.189$ | $s_{1,2} = 30.620$ |  |  |
| $L_2$ | $R_2 = -490.003$ | $t_2 = 7.145$ | $n_2 = 2.40035$ | $\nu_2 = 29.19$ |
|  | $R'_2 = -521.792$ | $s_{2,3} = 377.650$ |  |  |
| $M_1$ | $R_{M_1} = -1,180.962$ | $s_{3,4} = 354.685$ |  |  |
| $M_2$ | $R_{M_2} = -1,180.962$ |  |  |  |

In Table 13 the indices of refraction apply for radiation of 6.7 micron wavelength, and the Abbe numbers apply for radiation having a wavelength between 3.4 and 11.9 microns.

I claim:

1. A catadioptric image forming system comprising, from front to rear, a positive meniscus lens, a negative meniscus lens, and a concave mirror, said lenses being disposed coaxially to each other in front of said mirror with their concave surfaces facing each other, the sum of the powers of the surfaces of each of said lenses lying in absolute value between zero and 0.2 times the equivalent power of said system, the power of the rear surface of said positive meniscus lens lying between 2.25 and 12.5 times the sum of the powers of the surfaces of said negative meniscus lens, and the absolute value of the ratio of the sum to the difference of the radii of the adjacent surfaces of said lenses lying between zero and 0.45, the power of the rear surface of said negative meniscus lens lying between 0.5 and 1.5 times the power of the front surface of said positive meniscus lens.

2. A catadioptric image forming system according to claim 1, said system further comprising a convex secondary mirror $M_2$ disposed between said negative meniscus lens $L_2$ and said concave mirror $M_1$, the powers $\phi_{R_1}$ and $\phi_{R'_1}$ of the front and rear surfaces of said positive meniscus lens $L_1$, the powers $\phi_{R_2}$ and $\phi_{R'_2}$ of the front and rear surfaces of said negative meniscus lens $L_2$, and the powers $\phi_{M_1}$ and $\phi_{M_2}$ of said concave and secondary mirrors $M_1$ and $M_2$ being related to the equivalent power $\Phi_S$ of the system substantially as follows:

$$\phi_{R_1} = +0.85\Phi_S$$
$$\phi_{R'_1} = -0.75\Phi_S$$
$$\phi_{R_2} = -1.13\Phi_S$$
$$\phi_{R'_2} = +1.0\Phi_S$$
$$\phi_{M_1} = +1.7\Phi_S$$
$$\phi_{M_2} = -1.7\Phi_S$$

3. A catadioptric image forming system according to claim 2 in which said powers $\phi_{R_1}$, $\phi_{R'_1}$, $\phi_{R_2}$, $\phi_{R'_2}$, $\phi_{M_1}$, $\phi_{M_2}$ and $\Phi_S$ are related substantially as follows:

$$\phi_{R_1} = +0.849905\Phi_S$$
$$\phi_{R'_1} = -0.752929\Phi_S$$
$$\phi_{R_2} = -1.137345\Phi_S$$
$$\phi_{R'_2} = +1.012238\Phi_S$$
$$\phi_{M_1} = +1.700308\Phi_S$$
$$\phi_{M_2} = -1.700308\Phi_S$$

4. A catadioptric lens system according to claim 1, said system further comprising a convex secondary mirror $M_2$ disposed between said negative meniscus lens $L_2$ and said concave mirror $M_1$, said system conforming substantially to the following specification, wherein $f$ is the equivalent focal length of the system:

| Element | Radii | Thickness $t$ or Spacing $s$ | Index of Refraction $n$ |
|---|---|---|---|
| $L_1$ | $R_1 = +0.6f$ | $t_1 = 0.015f$ | $n_1 = 1.51$ |
|  | $R'_1 = +0.68f$ | $s_{1,2} = 0.03f$ |  |
| $L_2$ | $R_2 = -0.45f$ | $t_2 = 0.016f$ | $n_2 = 1.51$ |
|  | $R'_2 = -0.5f$ | $s_{2,3} = 0.38f$ |  |
| $M_1$ | $R_{M_1} = -1.18f$ | $s_{3,4} = 0.35f$ |  |
| $M_2$ | $R_{M_2} = -1.18f$ |  |  |

5. A catadioptric lens system according to claim 1, said system further comprising a convex secondary mirror $M_2$ disposed between said negative meniscus lens $L_2$ and said concave mirror $M_1$, said system conforming substantially to the following specification, wherein $f$ is the equivalent focal length of the system:

| Element | Radii | Thickness $t$ or Spacing $s$ | Index of Refraction $n$ | Abbe No. $\nu$ |
|---|---|---|---|---|
| $L_1$ | $R_1 = +0.608303f$ | $t_1 = 0.015322f$ | $n_1 = 1.5170$ | $\nu_1 = 64.5$ |
|  | $R'_1 = +0.686652f$ | $s_{1,2} = 0.030645f$ |  |  |
| $L_2$ | $R_2 = -0.454567f$ | $t_2 = 0.016344f$ | $n_2 = 1.5170$ | $\nu_2 = 64.5$ |
|  | $R'_2 = -0.510750f$ | $s_{2,3} = 0.377954f$ |  |  |
| $M_1$ | $R_{M_1} = -1.176256f$ | $s_{3,4} = 0.349965f$ |  |  |
| $M_2$ | $R_{M_2} = -1.176256f$ |  |  |  |

6. A catadioptric image forming system according to claim 1, said system further comprising a convex secondary mirror $M_2$ disposed between said negative meniscus lens $L_2$ and said concave mirror $M_1$, the powers $\phi_{R_1}$ and $\phi_{R'_1}$ of the front and rear surfaces of said positive meniscus lens $L_1$, the powers $\phi_{R_2}$ and $\phi_{R'_2}$ of the front and rear surfaces of said negative meniscus lens $L_2$, and the powers $\phi_{M_1}$ and $\phi_{M_2}$ of said concave and secondary mirrors $M_1$ and $M_2$ being related to the equivalent power $\Phi_S$ of the system substantially as follows:

$$\phi_{R_1} = +0.943\Phi_S$$
$$\phi_{R'_1} = -0.832\Phi_S$$
$$\phi_{R_2} = -1.119\Phi_S$$
$$\phi_{R'_2} = +0.994\Phi_S$$
$$\phi_{M_1} = +1.648\Phi_S$$
$$\phi_{M_1} = +1.648\Phi_S$$

7. A catadioptric lens system according to claim 1, said system further comprising a convex secondary mirror $M_2$ disposed between said negative meniscus lens $L_2$ and said concave mirror $M_1$, said system conforming substantially to the following specification, wherein $f$ is the equivalent focal length of the system:

| Element | Radii | Thickness $t$ or Spacing $s$ | Index of Refraction $n$ |
|---|---|---|---|
| $L_1$ | $R_1 = +0.65f$ | $t_1 = 0.016f$ | $n_1 = 1.61$ |
|  | $R'_1 = +0.73f$ | $s_{1,2} = 0.032f$ |  |
| $L_2$ | $R_2 = -0.47f$ | $t_2 = 0.017f$ | $n_2 = 1.53$ |
|  | $R'_2 = -0.53f$ | $s_{2,3} = 0.390f$ |  |
| $M_1$ | $R_{M_1} = -1.21f$ | $s_{3,4} = 0.367f$ |  |
| $M_2$ | $R_{M_2} = -1.21f$ |  |  |

8. A catadioptric lens system according to claim 1, said system further comprising a convex secondary mirror $M_2$ disposed between said negative meniscus lens $L_2$ and said concave mirror $M_1$, said system conforming substantially to the following specification, wherein $f$ is the equivalent focal length of the system:

| Element | Radii | Thickness $t$ or Spacing $s$ | Index of Refraction $n$ | Abbe No. $\nu$ |
|---|---|---|---|---|
| $L_1$ | $R_1 = +0.647901f$ | $t_1 = 0.016334f$ | $n_1 = 1.611$ | $\nu_1 = 58.8$ |
|  | $R'_1 = +0.734107f$ | $s_{1,2} = 0.031614f$ |  |  |
| $L_2$ | $R_2 = -0.469257f$ | $t_2 = 0.016861f$ | $n_2 = 1.525$ | $\nu_2 = 51.2$ |
|  | $R'_2 = -0.528200f$ | $s_{2,3} = 0.389910f$ |  |  |
| $M_1$ | $R_{M_1} = -1.213508f$ | $s_{3,4} = 0.366199f$ |  |  |
| $M_2$ | $R_{M_2} = -1.213508f$ |  |  |  |

9. A catadioptic image forming system according to claim 1, said system further comprising a convex secondary mirror $M_2$ disposed between said negative meniscus lens $L_2$ and said concave mirror $M_1$, the powers $\phi_{R_1}$ and $\phi_{R'_1}$ of the front and rear surfaces of said positive meniscus lens $L_1$, the powers $\phi_{R_2}$ and $\phi_{R'_2}$ of the front and rear surfaces of said negative meniscus lens $L_2$, and the powers $\phi_{M_1}$ and $\phi_{M_2}$ of said concave and secondary mirrors $M_1$ and $M_2$ being related to the equivalent power $\Phi_S$ of the system substantially as follows:

$$\phi_{R_1} = +0.871\Phi_S$$
$$\phi_{R'_1} = -0.773\Phi_S$$
$$\phi_{R_2} = -1.279\Phi_S$$
$$\phi_{R'_2} = +1.130\Phi_S$$
$$\phi_{M_1} = +1.715\Phi_S$$
$$\phi_{M_2} = -1.715\Phi_S$$

10. A catadioptric lens system according to claim 1, said system further comprising a convex secondary mirror $M_2$ disposed between said negative meniscus lens $L_2$ and said concave mirror $M_1$, said system conforming substantially to the following specifications, wherein $f$ is the equivalent focal length of the system:

| Element | Radii | Thickness $t$ or Spacing $s$ | Index of Refraction $n$ |
|---|---|---|---|
| $L_1$ | $R_1 = +0.60f$ | $t_1 = 0.016f$ | $n_1 = 1.53$ |
|  | $R'_1 = +0.68f$ | $s_{1,2} = 0.030f$ |  |
| $L_2$ | $R_2 = -0.48f$ | $t_2 = 0.016f$ | $n_2 = 1.61$ |
|  | $R'_2 = -0.54f$ | $s_{2,3} = 0.375f$ |  |
| $M_1$ | $R_{M_1} = -1.17f$ | $s_{3,4} = 3.52f$ |  |
| $M_2$ | $R_{M_2} = -1.17f$ |  |  |

11. A catadioptric lens system according to claim 1, said system further comprising a convex secondary mirror $M_2$ disposed between said negative meniscus lens $L_2$ and said concave mirror $M_1$, said system conforming substantially to the following specifications, wherein $f$ is the equivalent focal length of the system:

| Element | Radii | Thickness $t$ or Spacing $s$ | Index of Refraction $n$ | Abbe No. $\nu$ |
|---|---|---|---|---|
| $L_1$ | $R_1 = +0.602695f$ | $t_1 = 0.015695f$ | $n_1 = 1.525$ | $\nu_1 = 51.2$ |
|  | $R'_1 = +0.679543f$ | $s_{1,2} = 0.030378f$ |  |  |
| $L_2$ | $R_2 = -0.477635f$ | $t_2 = 0.016201f$ | $n_2 = 1.611$ | $\nu_2 = 58.8$ |
|  | $R'_2 = -0.540565f$ | $s_{2,3} = 0.374657f$ |  |  |
| $M_1$ | $R_{M_1} = -1.166038f$ | $s_{3,4} = 0.351874f$ |  |  |
| $M_2$ | $R_{M_2} = -1.166038f$ |  |  |  |

12. A catadioptric image forming system according to claim 1, said system further comprising a convex secondary mirror $M_2$ disposed between said negative meniscus lens $L_2$ and said concave mirror $M_1$, the powers $\phi_{R_1}$ and $\phi_{R'_1}$ of the front and rear surfaces of said positive meniscus lens $L_1$, the powers $\phi_{R_2}$ and $\phi_{R'_2}$ of the front and rear surfaces of said negative meniscus lens $L_2$, and the powers $\phi_{M_1}$ and $\phi_{M_2}$ of said concave and secondary mirrors $M_1$ and $M_2$ being related to the equivalent power $\Phi_S$ of the system substantially as follows:

$$\phi_{R_1} = +2.236\Phi_S$$
$$\phi_{R'_1} = -2.112\Phi_S$$
$$\phi_{R_2} = -2.858\Phi_S$$
$$\phi_{R'_2} = +2.684\Phi_S$$
$$\phi_{M_1} = +1.694\Phi_S$$
$$\phi_{M_2} = -1.694\Phi_S$$

13. A catadioptric lens system according to claim 1, said system further comprising a convex secondary mirror $M_2$ disposed between said negative meniscus lens $L_2$ and said concave mirror $M_1$, said system conforming substantially to the following specifications, wherein $f$ is the equivalent focal length of the system:

| Element | Radii | Thickness $t$ or Spacing $s$ | Index of Refraction $n$ |
|---|---|---|---|
| $L_1$ | $R_1 = +0.63f$ | $t_1 = 0.007f$ | $n_1 = 2.40$ |
| | $R'_1 = +0.66f$ | $s_{1,2} = 0.031f$ | |
| $L_2$ | $R_2 = -0.49f$ | $t_2 = 0.007f$ | $n_2 = 2.40$ |
| | $R'_2 = -0.52f$ | $s_{2,3} = 0.378f$ | |
| $M_1$ | $R_{M_1} = -1.18f$ | $s_{3,4} = 0.355f$ | |
| $M_2$ | $R_{M_2} = -1.18f$ | | |

14. A catadioptric lens system according to claim 1, said system further comprising a convex secondary mirror $M_2$ disposed between said negative meniscus lens $L_2$ and said concave mirror $M_1$, said system conforming substantially to the following specifications, wherein $f$ is the equivalent focal length of the system:

| Element | Radii | Thickness $t$ or Spacing $s$ | Index of Refraction $n$ | Abbe No. $\nu$ |
|---|---|---|---|---|
| $L_1$ | $R_1 = +0.626144f$ | $t_1 = 0.007145f$ | $n_1 = 2.40035$ | $\nu_1 = 29.19$ |
| | $R'_1 = +0.663189f$ | $s_{1,2} = 0.030620f$ | | |
| $L_2$ | $R_2 = -0.490003f$ | $t_2 = 0.007145f$ | $n_2 = 2.40035$ | $\nu_2 = 29.19$ |
| | $R'_2 = -0.521792f$ | $s_{2,3} = 0.377650f$ | | |
| $M_1$ | $R_{M_1} = -1.180962f$ | $s_{3,4} = 0.354685f$ | | |
| $M_2$ | $R_{M_2} = -1.180962f$ | | | |

References Cited in the file of this patent

UNITED STATES PATENTS 2,726,574    Mandler _____ Dec. 13, 1955

FOREIGN PATENTS 1,010,755    Germany _____ June 19, 1957

UNITED STATES PATENT OFFICE
CERTIFICATE OF CORRECTION

Patent No. 3,119,892                                January 28, 1964

Martin Shenker

It is hereby certified that error appears in the above numbered patent requiring correction and that the said Letters Patent should read as corrected below.

Column 8, line 15, formula (9) should appear as shown below instead of as in the patent:

$$0.5\phi_{R_1} < \phi_{R'_2} < 1.5\phi_{R_1}$$

column 10, TABLE 7, fifth column, line 1 thereof, for "$v_1=5.88$" read -- $v_1=58.8$ --; same TABLE 7, fifth column, line 2 thereof, for "$v_2=51.3$" read -- $v_2=51.2$ --; column 11, TABLE 10, second column, line 5 thereof, for "$R_{M_1}=-1.166.038$" read -- $R_{M_1}=-1,166.038$ --; same TABLE 10, second column, line 6 thereof, for "$R_{M_2}=1,166.038$" read -- $R_{M_2}=-1,166.038$ --; column 13, line 51, for $\phi_{M_1}=+1.648\Phi_S$" read -- $\phi_{M_2}=-1.648\Phi_S$ --; column 14, in the table for claim 8, third column, line 2 thereof, for "$s_{1,3}=0.031614f$" read -- $s_{1,2}=0.031614f$ --.

Signed and sealed this 21st day of July 1964.

(SEAL)
Attest:

ESTON G. JOHNSON                                    EDWARD J. BRENNER
Attesting Officer                                    Commissioner of Patents